March 17, 1925.

D. F. AXELSON

BALL SEAT

Filed May 11, 1922

1,530,287

INVENTOR:
DELBERT F. AXELSON,
BY
 Graham Harris
ATTORNEYS.

Patented Mar. 17, 1925.

1,530,287

UNITED STATES PATENT OFFICE.

DELBERT F. AXELSON, OF LOS ANGELES, CALIFORNIA, ASSIGNOR TO AXELSON MACHINE COMPANY, A CORPORATION OF CALIFORNIA.

BALL SEAT.

Application filed May 11, 1922. Serial No. 560,179.

*To all whom it may concern:*

Be it known that I, DELBERT F. AXELSON, a citizen of the United States, residing at Los Angeles, in the county of Los Angeles and State of California, have invented a new and useful Ball Seat, of which the following is a specification.

My invention relates to oil well pumps and particularly to the ball valve and seat which is now standard in pumps of this character.

The principal object of my invention is to produce a ball seat which will be very durable and free from certain objections now found in devices of this character.

Further objects and advantages will be made evident hereinafter.

Referring to the drawing which is for illustrative purposes only,

Figure 1:
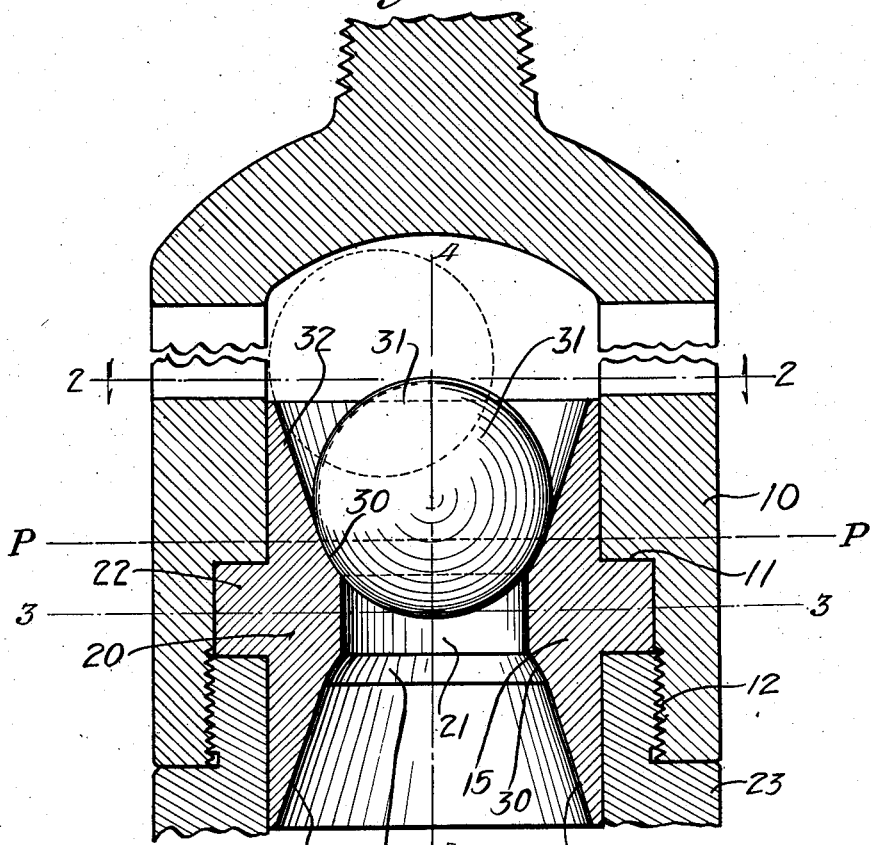
Fig. 1 is a cross section through a preferred embodiment of one form of my invention.
Figure 2:
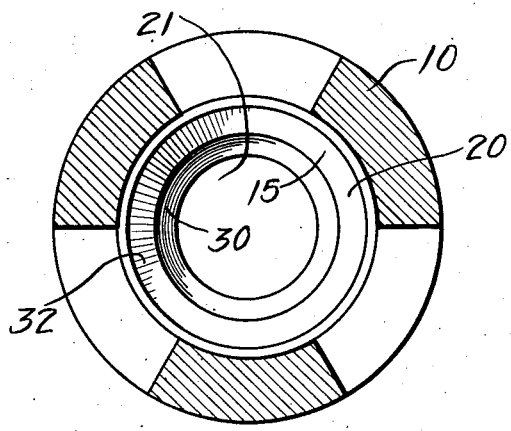
Fig. 2 is a section on a plane indicated by the line 2—2 of Fig. 1, this view being on a reduced scale as compared to Fig. 1.

In the form of the invention shown, 10 is a ball cage having a shoulder 11 adjacent to an opening which is provided with a thread 12. Seating on the shoulder 11 is a ball seat 15 which is made symmetrical on either side of a plane indicated by the line 3—3 of Fig. 1 and which is also symmetrical around an axis indicated by the line 4—4 of Fig. 1. The object of making the member 15 symmetrical on either side of the plane 3—3 is to make it reversible, thus giving double wear. The ball seat 15 consists of a body 20 having a central opening 21 therein. A flange 22 is provided which seats upon the shoulder 11, being held thereon by means of a threaded member 23. Immediately adjacent to the opening 21 and on either side thereof are ball seats 30 which are spherical in their outline having the same radius as a ball 31 which seats in the upper seat as shown in Fig. 1. Above and below the seats 30 are conical surfaces 32.

The conical surfaces 32 are the principal point of novelty in the invention. In the present form of valve seat now in common use throughout the world, the top of the seat is made flat along a plane indicated by the line P—P in Fig. 1. That is, the top of the seat is made flat, forming a sharp corner at the point of intersection of the spherical seat and this flat top. The ball in falling in the present form of construction strikes against the thin edge of the corner thus battering it out of shape and distorting the spherical surface so that fluid leaks past the ball after it is seated.

In the form of construction shown in the drawing the cone is tangential to the spherical seat and no corner is formed therebetween. The ball in falling is accurately guided to its seat, due to the guiding action of the cone. In practice a high degree of accuracy as to the tangency of the cone to the spherical seat is not found necessary.

The walls of the openings 32 diverge nearly to the periphery of the seat 15 at the ends of said seat, so that the ball 31, when elevated above said seat, may engage the inside of the cage, whereby the ball is prevented from pounding against either of said ends when uppermost, as illustrated in dotted lines in Fig. 1.

I claim as my invention:

In a deep well oil pump, the combination with a ball cage and a threaded member in threaded engagement with said cage, said cage being formed with an internal shoulder, of: a valve seat fitting within said cage and said threaded member and formed with an external flange held against said shoulder by the engagement of said threaded member with said flange, said valve seat being formed with a vertical opening therein intermediate its ends; a ball seat at the upper edge and a ball seat at the lower edge of said opening, there being conical openings in said seat fitting communicating with, and diverging from, said intermediate opening, and disposed tangentially to said seats; and a ball adapted to rest upon one of said ball seats when one of said seats is in its uppermost position, and to be guided onto said seat by the wall of the conical opening converging to the seat, each of said seats having a radius of curvature equal to that of said ball.

In testimony whereof, I have hereunto set my hand at Los Angeles, California, this 5th day of May, 1922.

DELBERT F. AXELSON.